(12) United States Patent
Ament et al.

(10) Patent No.: US 6,592,165 B2
(45) Date of Patent: Jul. 15, 2003

(54) COVERING DEVICE FOR THE LOAD SPACE OF A MOTOR VEHICLE

(75) Inventors: Eduard Ament, Herrsching-Breitbrunn (DE); Herbert Walter, Ebersbach (DE); Beate Krause, Rudersberg-Michaelau (DE); Hans-Joachim Winkler, Backnang (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/051,851

(22) Filed: Jan. 17, 2002

(65) Prior Publication Data

US 2002/0113452 A1 Aug. 22, 2002

(30) Foreign Application Priority Data

Jan. 18, 2001 (DE) ......................................... 101 02 627

(51) Int. Cl.⁷ ............................................... B60R 11/00
(52) U.S. Cl. ..................................... 296/37.16; 296/98
(58) Field of Search ............................ 296/37.16, 37.8, 296/98, 146.8, 106; 160/274, 275, 276

(56) References Cited

U.S. PATENT DOCUMENTS 5,727,836 A * 3/1998 Hosoya ................... 296/37.16
6,402,217 B1 * 6/2002 Ament et al. ............. 296/37.16

FOREIGN PATENT DOCUMENTS

| DE | 197 38 534 C1 | 4/1999 | ............. B60R/5/04 |
| DE | 198 47 787 A1 | 6/1999 | ............. B60R/5/04 |

* cited by examiner

Primary Examiner—Joseph D. Pape
(74) Attorney, Agent, or Firm—Greenberg Traurig, P.C.

(57) ABSTRACT

A covering device for the load space of a motor vehicle, having a flexible surface structure, is held, in a rollable or extendable manner, on a winding shaft supported solidly with the loading space. A coiled spring apparatus for exerting the force for rolling up onto the surface structure is provided on the winding shaft. A form-stable extending element is positioned on one frontal end area of the surface structure. The surface structure is guided over its path of extension within the load space by a guiding device, in that at least one locking device for blocking the surface structure relative to the guiding device is provided in at least one partially-extended working position, and in that a manually-triggerable releasing device, by which the locking of the surface structure can be ended, is provided for the locking device.

11 Claims, 8 Drawing Sheets

COVERING DEVICE FOR THE LOAD SPACE OF A MOTOR VEHICLE

BACKGROUND OF THE INVENTION

1. The Technical Field

The invention relates to a covering device for the load space of a motor vehicle with a flexible surface structure which is held, in a rollable or extendable manner, on a winding shaft supported solidly with the load space, whereby a coiled spring apparatus for exerting the force for rolling up onto the surface structure is assigned to the winding shaft, and whereby a form-stable extending element is positioned on one frontal end area of the surface structure.

2. The Prior Art

Such a covering device is generally known as a load space cover for a station wagon. The covering device has a modular casing, which is positioned behind a back seat in a manner connected solidly with the vehicle—that is to say, solidly connected with the load space. A winding shaft, on which a flexible surface structure in the form of a covering surface is held in a rollable or extendable manner, is rotatably supported inside the modular casing. The winding shaft is stressed in the direction of rolling up by means of a coiled spring, so that the covering surface is automatically drawn back and rolled up again after being extended and placed into the working position, as well as after a renewed releasing from the working position. A forward end area of the surface structure in the form of a covering surface is provided with an extending element in the form of a contour part, which is provided, on opposing sides, with suspension elements for fixing the covering surface within holding devices which are solidly connected with the motor vehicle. A handle opening, through which the unhinging of the contour part by hand and the manual drawing back of the covering surfaces into the modular casing can be carried out, is provided in the contour part. For the manual retraction, the corresponding operator must bend over into the load space and move the hand that has grasped the contour part all the way back to the modular casing.

SUMMARY OF THE INVENTION

It is the task of the invention to create a covering device of the type already stated, which makes possible a simplified moving of the surface structure from an extended working position into the rolled-up, resting position.

This task is solved through the fact that the surface structure is guided over its path of extension within the load space by means of a guiding device; that, at least one locking device for blocking the surface structure relative to the guiding device is provided in at least one partially-extended working position; and that, a manually-triggerable releasing device, by means of which the locking of the surface structure can be ended, is assigned to the locking device. By means of a simple triggering of the releasing device, the surface structure is consequently automatically drawn back into its resting position. The releasing device can be positioned solidly with the load space and/or with the surface structure. The locking device can also be positioned either in a stationary manner in the area of the guiding device, and/or on the forward end area of the surface structure, however.

In one development of the invention, two guiding sections positioned approximately horizontally in the load space on opposing sides of the surface structure are provided as a guiding device. By that means, the surface structure is flanked, on both sides, by the guiding sections and guided into the same.

In a further development of the invention, the forward end area of the surface structure is, within every guiding section, guided through a sliding element. The forward end area can be provided with a form-stable contour part which is provided over the entire width of the surface structure, which contour part also forms the extending element in the sense of the invention. In such a design, sliding heads can be provided on opposing sides of the contour part, which sliding heads serve as sliding elements for the guiding in the guiding section.

In a further development of the invention, a catching function element which is movably supported between a blocking position and a release position is assigned to each sliding element, which catching function element is spring-stressed by a spring element into the blocking position, with which element the releasing device engages for the temporary conveying of the catching function element into the release position. The sliding element itself can form the catching function element, or a corresponding catching function element can be integrated into every sliding element, or else a catching function element can be supported, in another way and manner, on the corresponding sliding elements.

In a further development of the invention, the catching function elements are rigidly connected with a common shaft, which is supported in the extending element transversely to the direction of extension of the surface structure. In a further development, the releasing device has an activating handle supported coaxially with the shaft connected with the catching function elements supported in a swivelable manner on the extending element. By means of these developments, the blocking of the surface structure can be ended by means of a simple swiveling of the activating handle into an at least partially extended working position, through which the surface structure can be automatically conveyed, by means of the coiled spring apparatus, into its resting position or into the next locking position located between the same. The blocking is preferably carried out in a form-locking manner by the catching function elements through the fact that catching points corresponding to the guiding sections are provided. The guiding sections are adjusted to the sliding elements in such a manner that a low-clearance sliding guidance results for the sliding elements as soon as the catching function elements are conveyed into their release position. The corresponding catching points for the catching function elements can also be positioned in a manner displaced laterally to the slide paths of the guiding sections for the sliding elements, so that the catching function elements themselves proceed outside of these slide paths.

In a further development of the invention, the activating handle is moved out opposite to its releasing function and, for the opposing guiding movement, engages with a restoring spring on the activating handle which, for the releasing function, exerts a torque on the activating handle. Thus, in the event that the activating handle is, for the conveying of the catching function elements into the release position, pressed obliquely downwardly and remains in this position oriented transversely downwardly during the rolling up of the surface structure, the ability to move out in the opposite direction ensures a free-running position in the event that the activating handle directed downwardly is guided upwardly by items of luggage located below the covering surface. Through this free-running function, no stresses which could impair the automatic retracting function of the surface structure are exerted on the front end area of the surface structure or on the extending element, despite the striking of the activating handle against corresponding items of luggage or transported objects during the moving back of the surface structure.

Further advantages and characteristics of the invention proceed from the claims, as well as from the following description of preferred examples of implementation of the invention, which are represented by means of the diagrams.

DETAILED DESCRIPTION OF THE INVENTION

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

Figure 1:
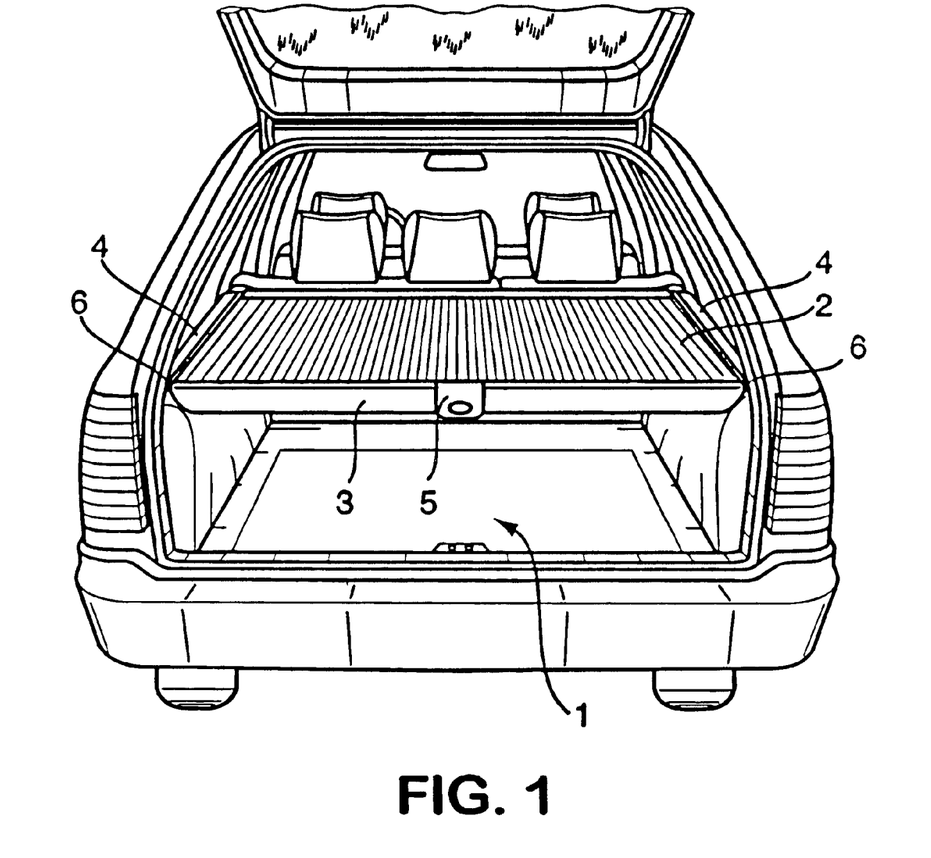
FIG. 1a is a sectional view of a modular casing for the flexible surface structure portion of the covering device of the present invention.
FIG. 1b is a sectional view of a modular casing for the flexible surface structure portion of the covering device, in the region of an end cap thereof, illustrating schematically, a damping device.
Figure 1A:
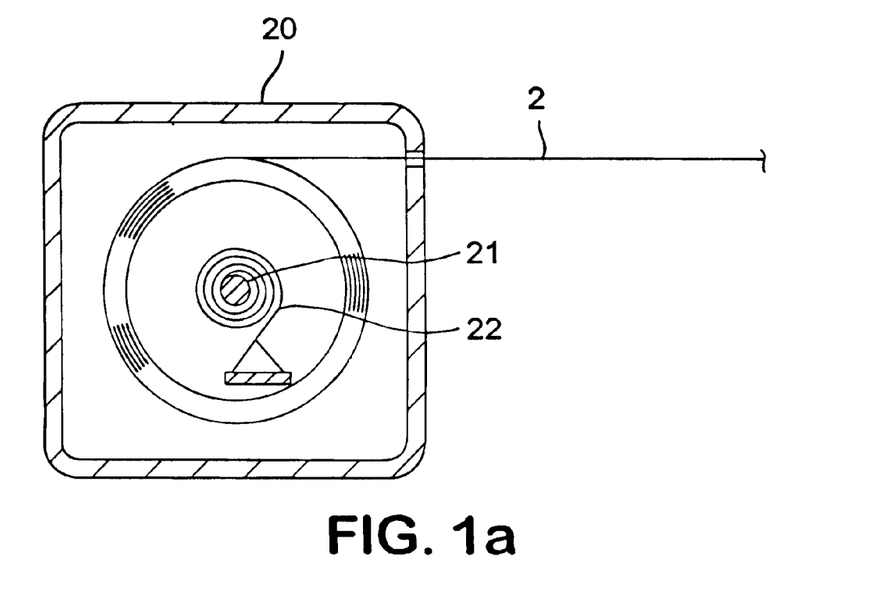

A motor vehicle in the form of a station wagon has, in accordance with FIG. 1, a load space 1 in a rear area which can be covered over, at approximately the height of the side edge of the motor vehicle, by a covering device. The covering device has a modular casing 20, shown generally in FIG. 1a, which is positioned horizontally, in essentially the known manner, behind the back rest of a back seat and proceeding in the transverse direction of the vehicle, which casing is solidly connected with the vehicle and the load space. In order for it to be able to be removed, the modular casing 20 is attached in a detachable manner within corresponding holding devices, which are solidly connected with the motor vehicle. A winding shaft 21 is supported in a rotatable manner inside the modular casing 20, which winding shaft 21, in the manner as known per se, supports one frontal end of a flexible surface structure in the form of a covering surface 2 which can be extended from the modular casing 20, and which is provided for a horizontal covering of the load space 1. The winding shaft 21 is stressed by a coiled spring apparatus 22, which acts on the winding shaft 21 in the direction of retraction or the direction of rolling up of the surface structure 2.

The covering surface 2 serving as a surface structure has, within its forward area—that is to say, the end area projecting out from the modular casing—a contour part 3 which extends over the entire width of the surface structure 2. The contour part 3 is configured in a form-stable manner and is provided, in its center, with an activating handle 5 supported in a swivelable manner, which is part of a releasing device that will be described in further detail in the following.

The contour part 3, which serves as an extending element in the sense of the invention, is supported on opposing sides in a displaceable manner, roughly horizontally and longitudinally, within a guiding device in the form of a guiding section 4 designed as a guide rail. Both of the guiding sections 4 are solidly positioned with the motor vehicle on opposing side walls of the load space 1 and proceed at approximately the height of the side edge, roughly horizontally towards the back and in the longitudinal direction.

The guiding of the contour part 3—that is to say, of the forward end area of the surface structure 2 in the lateral guiding sections 4—is carried out by means of sliding elements 9, 15 which are each positioned, in a longitudinally displaceable manner, in a corresponding connecting link guide 14 of each guiding section 4. The specific connecting link guide 14 forms the slide path for each sliding element 9, 15, and thereby for the contour part 3 as well.

Figure 2:
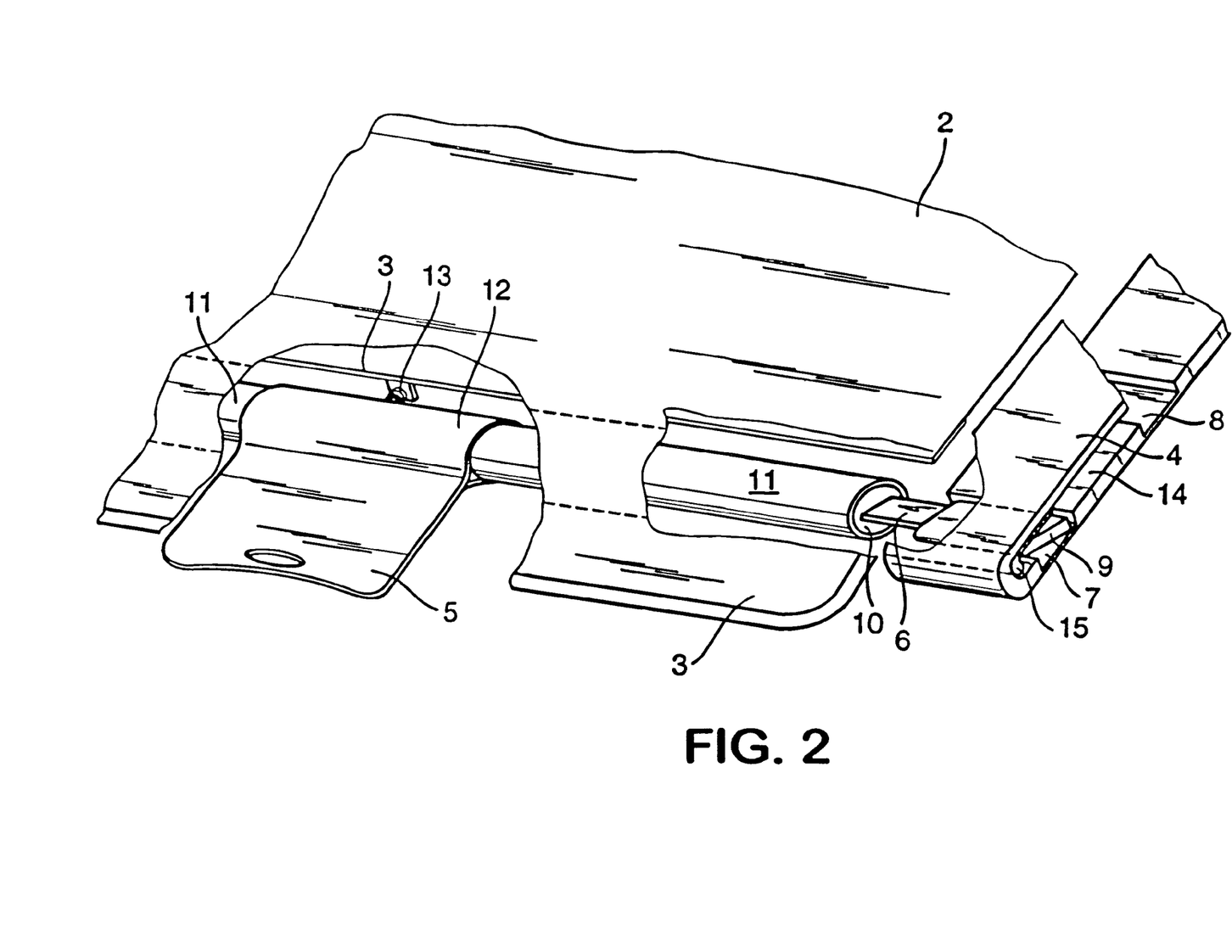
FIG. 2 is an enlarged, perspective representation, a cut-out section of the covering device in the extended operating condition.
Figure 3:
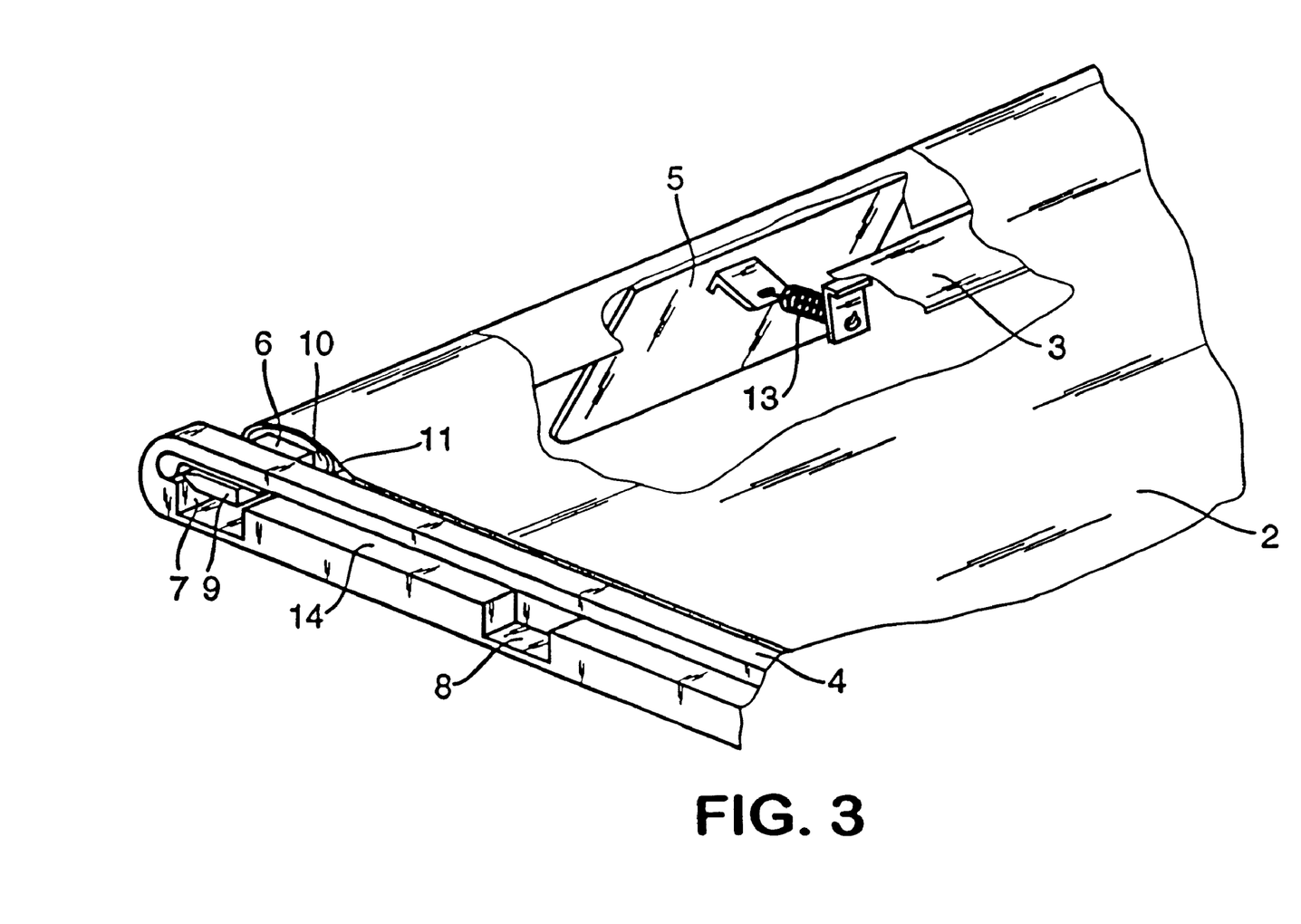
FIG. 3 is a further illustration of the device of the embodiment of FIG. 2 in a released intermediate position.
Figure 4:
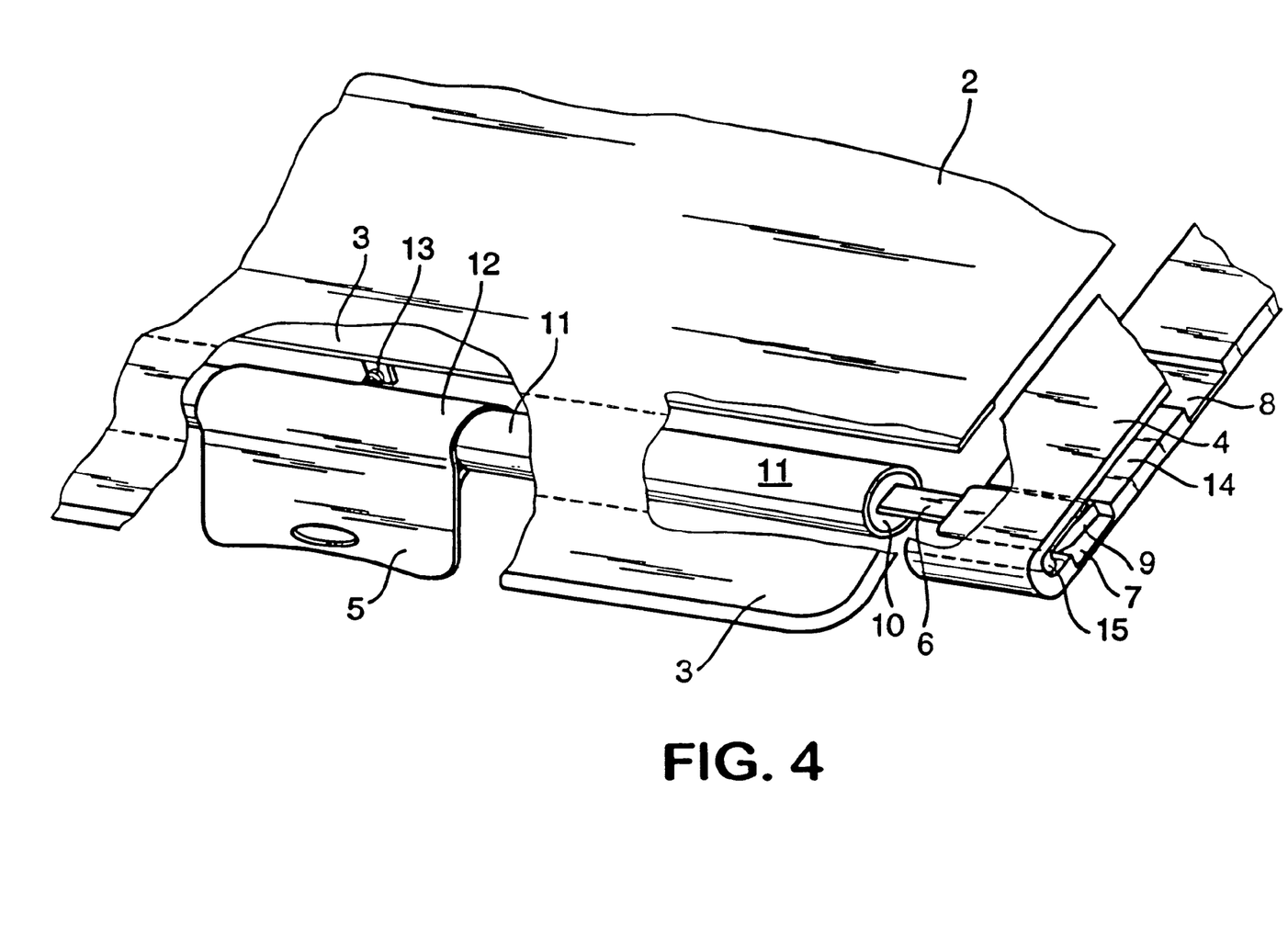
FIG. 4 is a further illustration of the device of the embodiment of FIG. 3, in another perspective representation.
Figure 5:
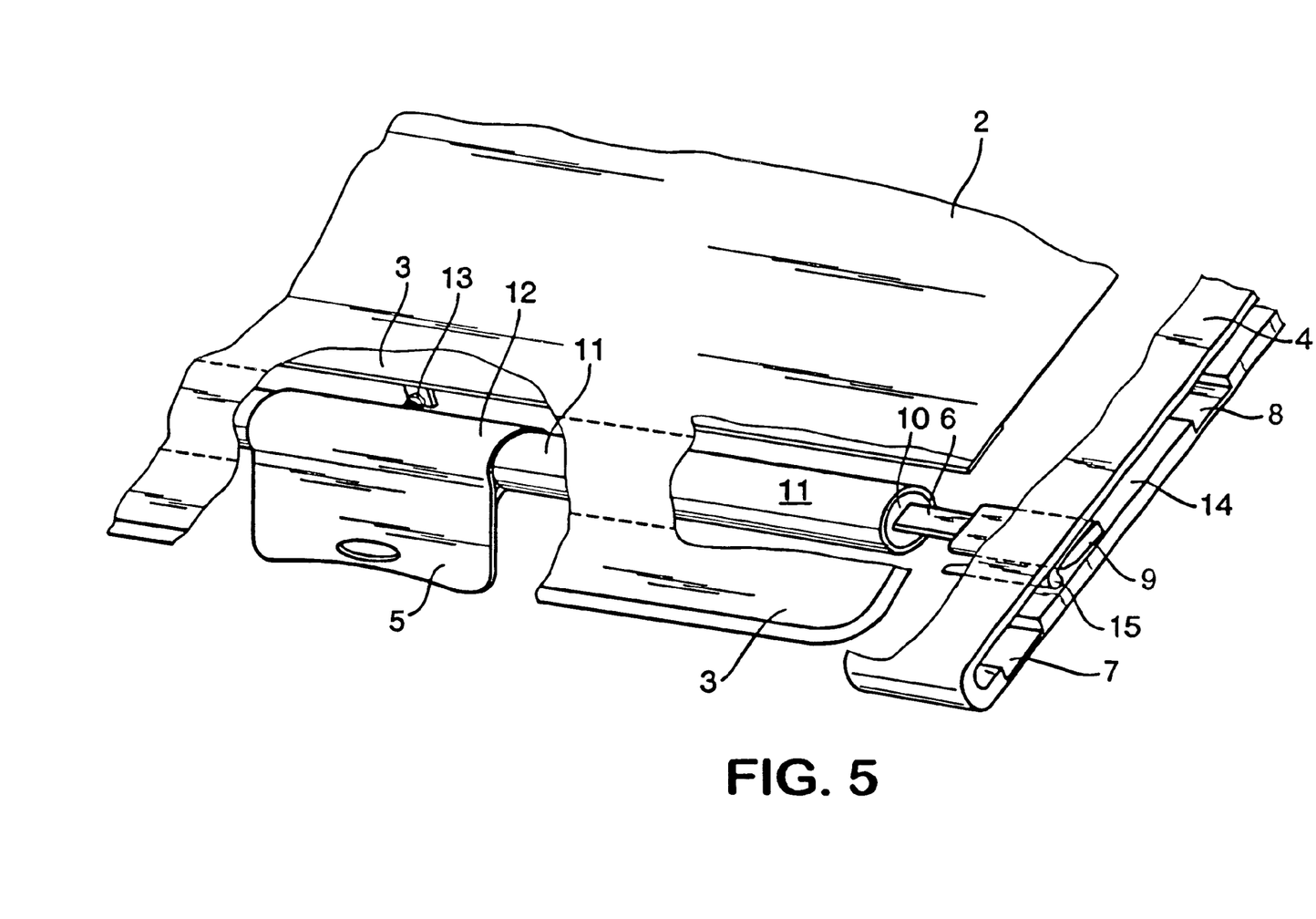
FIG. 5 is a further illustration of the covering device in accordance with FIGS. 2 to 4, in a partially-inserted intermediate position.

Within each guiding section 4—and synchronized at the same height—, a catching area 7 for the locking of the surface structure 2 is provided in an extended working position. The catching area 7 in each guiding section 4 is designed as a recess in the shape of a transverse slot. The sliding elements 9, 15, by means of which the contour part 3, and thereby the forward end area of the surface structure 2, is guided into the guiding sections 4, are formed by a slidably movable section 15 which is connected in a single part with the contour part 4, on the one hand, and with a catching head 9, on the other hand. The two opposing catching heads 9 are connected with one another by way of a common shaft 10 which extends over the entire width of the surface structure 2, which is supported in corresponding coaxial tube sections 11 of the contour part 3. The shaft 10 has one flat, plate-like extension on each of its opposing front ends 6, as shown in FIGS. 1 and 2, which extension juts outwardly and supports the specific catching head 9. The activating handle 5 positioned in the middle, which handle is consequently positioned between the two tube sections 11 of the contour part 3, is solidly connected with the shaft 10. As is evident from FIGS. 6 to 7, the activating handle 5 is solidly connected with the casing of the shaft 10, particularly by means of welding or adhesion. At the height of the activating handle 5, a guiding device in the form of a compression spring 13 engages with the shaft 10, which compression spring is supported, on the one hand, on an extension of the shaft 10, which is not depicted in further detail, and a support bracket of the contour part 3, on the other hand, which is likewise not depicted in further detail. The compression spring 13 consequently exerts a torque on the shaft 10, which torque presses the activating handle 5 into a horizontal resting position in accordance with FIGS. 2 and 6 and consequently pre-stresses into this direction. In accordance with FIGS. 6 to 8, the compression spring 13 consequently exerts a torque onto the shaft 10 in the clockwise direction.

As is evident from FIGS. 2 to 8, both of the catching heads 9 are placed transversely relative to the activating handle 5 projecting radially out relative to the shaft 10. The transverse position is selected in such a manner that, in the horizontal orientation of the activating handle 5, the catching head 9 projects transversely forward and downwardly. In this locking position, it engages with a rear surface of the catching area 7, as is evident from FIGS. 2 and 6. Through that fact, the contour part 3, and thereby the surface structure 2 as well, are, in the extended working position, blocked by the force of the compression spring 13 in the opposing catching areas. The restoring force of the coiled spring acting on the surface structure 2 amplifies the form-locking catching of the surface structure 2 in this working position.

Figure 6:
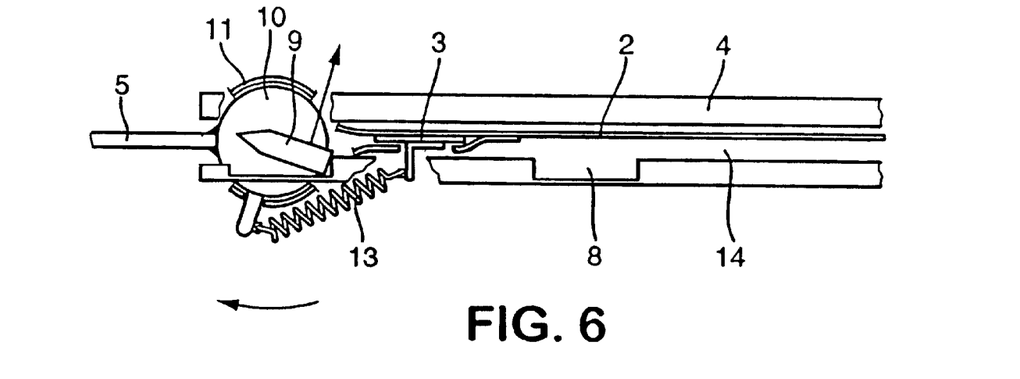
FIG. 6 is a partially cut-away lateral view, showing the covering device in accordance with FIGS. 2 to 5, in the locked working position.
Figure 7:
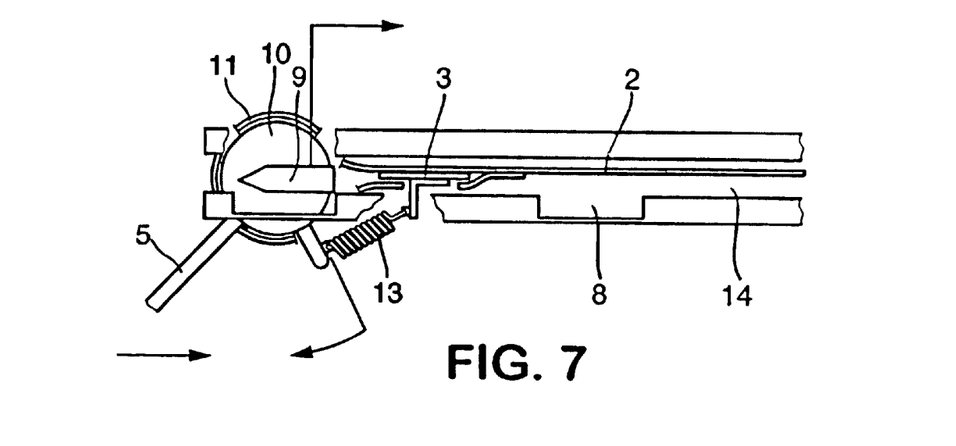
FIG. 7 is an illustration of the covering device in a lateral view in the intermediate position in accordance with FIG. 3.
Figure 8:
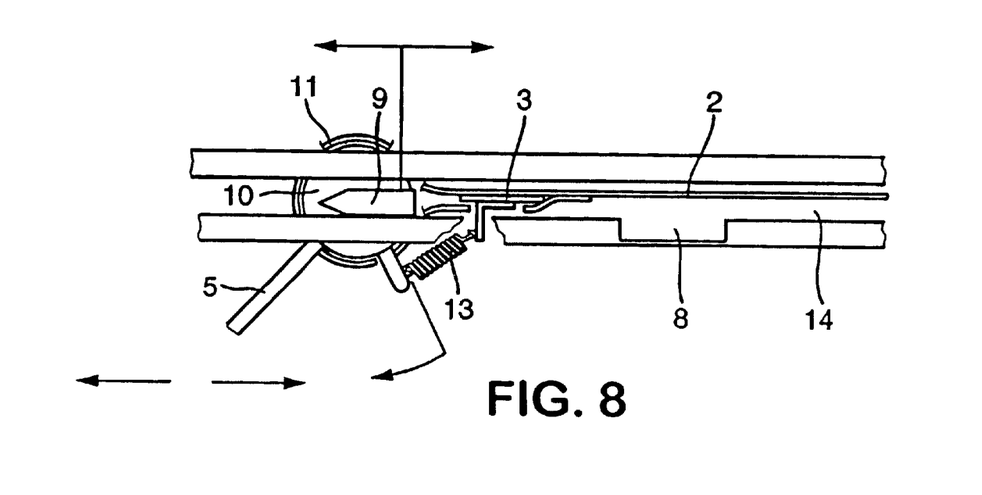
FIG. 8 is an illustration of the covering device in an additional intermediate position corresponding to FIG. 5.

In order to now draw the surface structure 2 back out from the extended working position and into an intermediate position, such as into the area of the catching areas 8, for example, or entirely retracted into the resting position on the modular casing, the activating handle 5 is, in a simple manner, pressed downwardly, as the result of which the shaft 10 rotates and the catching heads 9 are swiveled upwardly into the direction of the upper, diagonally extending arrow shown in FIG. 6. Because of the restoring force of the coiled spring, the catching heads 9 are retracted into the connecting link guide 14 of each guiding section 4 as soon as they align with this connecting link guide 14, as shown in FIGS. 7 and 8, as well as FIGS. 3 to 5. The downward swiveling of the activating handle 5 is carried out against the pressure force of the compression springs 13. Thus, as soon as an additional intermediate position, such as in the area of the catching area 8, for example, is brought about upon the insertion of the surface structure 2, the pressure force of the compression spring 13 automatically presses the catching heads 9 downwardly in the clockwise direction again, so that the catching heads 9 engage at the intermediate position—that is to say, in the catching area 8—and bring about a renewed locking there for an additional, only partially extended, working position.

Figure 9:
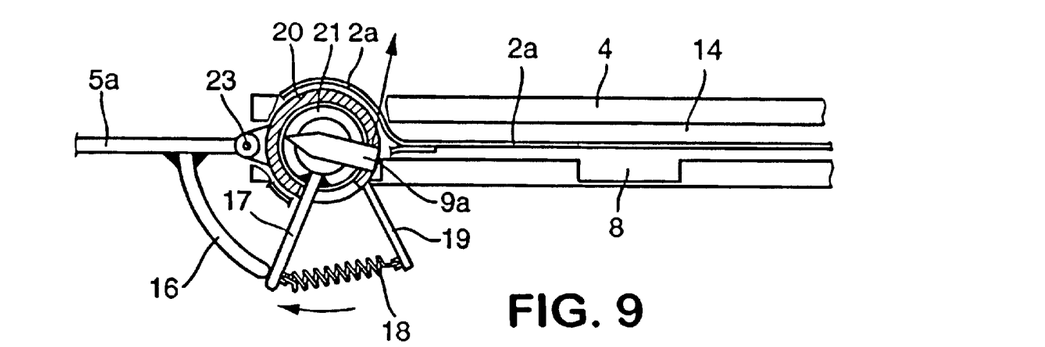
FIG. 9 is an illustration of another, alternative, embodiment of the present invention, having a free-running device for an activating handle of a releasing device of the covering device, whereby the covering device is depicted in different positions.
Figure 10:
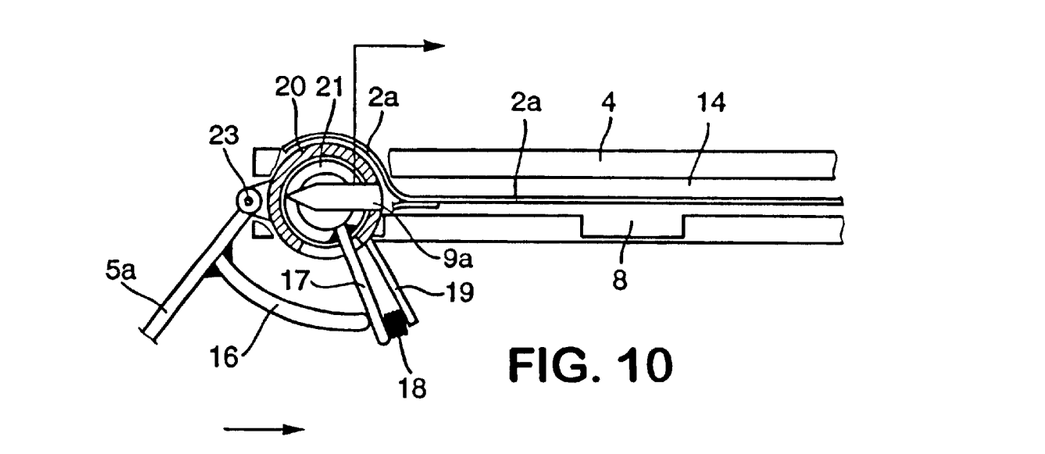
FIG. 10 is a further illustration of the embodiment of FIG. 9.
Figure 11:
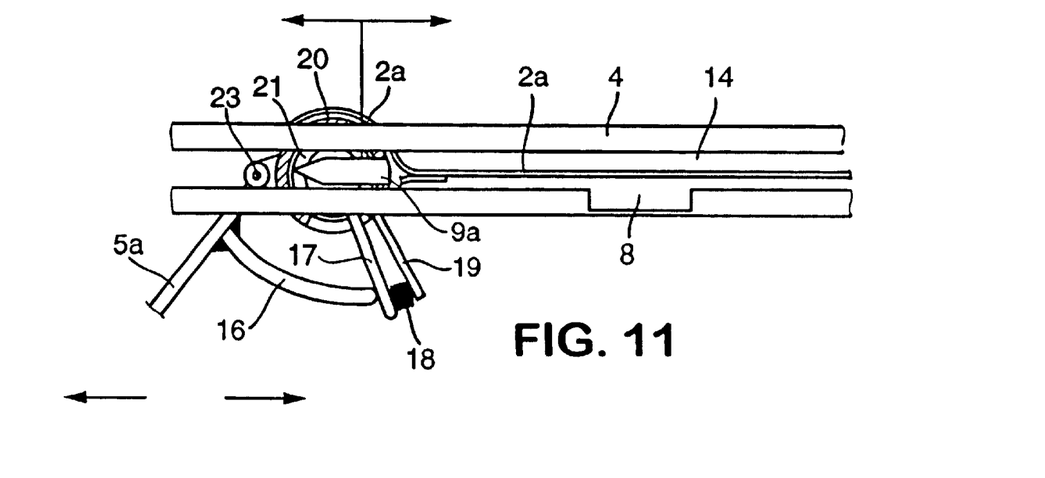
FIG. 11 is a still further illustration of the embodiment of FIG. 9.

In the example of implementation in accordance with FIGS. 9 to 11, the covering device essentially corresponds to the example of implementation previously described in FIGS. 1 to 8, so that only the differences will be discussed in detail in the following. Each catching head 9a is rigidly connected with one shaft 21, which is supported in a rotatable manner in a support tube 20 which is stationary within the contour part 3 not depicted. The shaft 21 is provided with an extension 17 projecting out radially through a corresponding recess of the support tube 20, on which extension a compression spring 18 is supported. The compression spring 18 is supported, with its other end, on a supporting extension 19 which is rigidly connected with the support tube 20 and likewise projects out transversely and downwardly. A corresponding transition end of the surface structure 2a surrounds the support tube 20. A bearing block 23, on which the activating handle 5a is supported in a swivelable manner, is integrally formed with the support tube 20. The activating handle 5a is supported on the supporting extensions 17 by means of a transmission finger 16. By means of a downward swiveling movement of the activating handle 5a, the transmission finger 16 is additionally moved along, as the result of which the supporting extension 17 in the representation in accordance with FIGS. 9 to 11 is swiveled forward in the clockwise direction. By that means, each catching head 9a moves into the position aligning with the connecting link guide 14, through which the coiled spring can draw the surface structure 2a, including the catching heads 9a, into the direction of the modular casing. The restoration force of the compression spring 18 brings it about that the catching head 9a is turned back into its transversely-placed position as soon as a possibility for that is provided by the adapted connecting link guide 14. This is the case with the catching area 8 representing an intermediate position. Thus, in the same way as in the example of implementation in accordance with FIGS. 2 to 8, the catching head 9a is forcefully pressed downwardly as soon as the catching area 8 has been reached.

In difference from the construction design in accordance with FIGS. 2 to 8, the activating handle 5a is provided with a type of free-running device since, in the condition in accordance with FIG. 11, it is only supported by its own weight on the supporting extensions 17 by means of its transmission finger 16. Thus, as soon as an opposing force acts on the activating handle 5a, such as through an item of luggage or a transported object on which the activating handle 5a engages upon the retraction of the surface structure 2a, for example, the activating handle 5a moves out in an upward direction.

In an example of implementation of the invention which is not depicted, a free-running device function of the activating handle, which brings about a moving out of the activating handle upon striking an obstacle, is brought about through the fact that the activating handle is supported in a swiveling manner opposite the direction of release through its normal resting position and that a return spring is assigned to the activating handle, which return spring, upon the guiding out, moves the activating handle, by striking against an obstacle, back against the releasing direction and into the starting position again as soon as the stress from the obstacle has been eliminated.

Figure 1B:
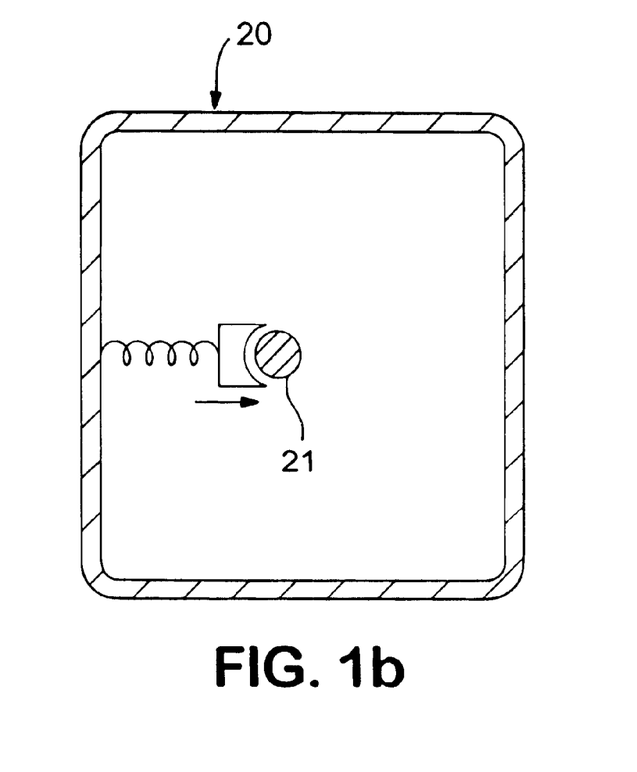

In an additional example of implementation of the invention, a damping device can additionally be assigned to the winding shaft, by means of which device the restoring- and rolling-up movement of the surface structure, which is brought about by the catching head of the coiled spring, is braked. The damping- and braking effect can be extended over the entire restoring path, or over just a final section shortly before reaching the retracted final position. This damping device is shown schematically in FIG. 1b, in the form of a biased braking force exerted on shaft 21. Such damping devices are generally known in the art, and the specific details may be omitted, as being readily available to one of ordinary skill in the art having the present disclosure before them.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

What is claimed is:

1. A covering device for the load space of a motor vehicle, the covering device including a modular casing having therein a winding shaft and a coiled spring apparatus operably associated with the winding shaft, the covering device further comprising:

a flexible surface structure having a forward end, said surface structure being rollably supported on the winding shaft, wherein the coiled spring apparatus exerts a biasing force on the surface structure prompting the surface structure to be rolled up on the winding shaft;

a form-stable extending element operatively fixed to the forward end of the surface structure;

at least one guiding device disposed within the load space, the at least one guiding device including at least one catching area;

at least one locking device operatively associated with the at least one guiding device for maintaining the position of the surface structure relative to the at least one guiding device, wherein the at least one locking device is capable of transitioning between a restrained position within the at least one catching area and an unrestrained position without the at least one catching area; and a releasing device operably associated with the extending element, such that manipulation of the releasing device causes the at least one locking device to be transitioned from its restrained position to its unrestrained position, thereby causing the surface structure to be retracted in the direction of the winding shaft due to the biasing force being exerted on the surface structure by the coiled spring apparatus.

2. The covering device of claim 1, wherein the at least one locking device is positioned adjacent the forward end of the surface structure.

3. The covering device of claim 1, wherein the releasing device is positioned adjacent the forward end of the surface structure.

4. The covering device of claim 1, comprising two guiding devices positioned horizontally on opposing sides of the surface structure.

5. The covering device of claim 4, wherein the forward end of the surface structure is operatively associated with two locking devices, each one of the locking devices being maintained within one of the guiding devices.

6. The covering device of claim 5, wherein the two locking devices are biased toward their restrained positions by a spring element operatively associated with the releasing device.

7. The covering device of claim 6, wherein the two locking devices are rigidly connected with a common shaft, which shaft is rotatably supported within the extending element, transversely to the direction of extension of the surface structure.

8. The covering device of claim 7, wherein the releasing device comprises an activating handle supported coaxially with the shaft, wherein the activating handle is supported in a swivelable manner on the extending element.

9. The covering device of claim 8, wherein the activating handle is manipulable in a direction opposite to its releasing function.

10. The covering device of claim 9, further comprising a return spring operably associated with the activating handle, which return spring exerts a torque on the activating handle.

11. The covering device of claim 1, further comprising a damping device, operably associated with the winding shaft for applying a braking force to retard the retracting movement of the surface structure.

* * * * *